(12) United States Patent
Sharp et al.

(10) Patent No.: US 12,370,612 B2
(45) Date of Patent: Jul. 29, 2025

(54) ULTRA-HIGH PRESSURE CUTTING DEVICES, USES AND METHODS THEREOF

(71) Applicant: NuWave Industries Inc., Marwayne (CA)

(72) Inventors: Tim Sharp, Marwayne (CA); Brennan Sharp, Dewberry (CA); Troy Illingworth, Dewberry (CA)

(73) Assignee: NuWave Industries Inc., Marwayne (CA)

( * ) Notice: Subject to any disclaimer, the term of this patent is extended or adjusted under 35 U.S.C. 154(b) by 387 days.

(21) Appl. No.: 18/097,641

(22) Filed: Jan. 17, 2023

(65) Prior Publication Data

US 2023/0226627 A1 Jul. 20, 2023

Related U.S. Application Data

(60) Provisional application No. 63/300,307, filed on Jan. 18, 2022.

(51) Int. Cl.
*B23D 21/14* (2006.01)
(52) U.S. Cl.
CPC .................................. *B23D 21/14* (2013.01)
(58) Field of Classification Search
CPC . B23D 21/14; Y10T 83/0443; Y10T 83/0453; Y10T 83/2066; Y10T 83/2068; E21B 29/002; E21B 29/005; E21B 29/007; E21B 43/14; B24C 1/045; B24C 1/00; B24C 3/32; B24C 3/325

USPC ................ 30/92; 166/298, 297, 55.7, 55, 56
See application file for complete search history.

(56) References Cited

U.S. PATENT DOCUMENTS

| | | | | |
|---|---|---|---|---|
| 3,338,305 | A * | 8/1967 | Pittman | E21B 29/12 166/55.7 |
| 6,626,074 | B1 * | 9/2003 | Wheeler | B23D 45/128 166/55.6 |
| 9,103,088 | B2 * | 8/2015 | Clark, II | E02D 9/04 |
| 11,168,529 | B2 * | 11/2021 | Gromes, Sr. | B24C 3/325 |
| 2013/0112393 | A1 * | 5/2013 | Cumby | E21B 29/005 166/55 |
| 2016/0375508 | A1 * | 12/2016 | Pierce | B23B 5/162 30/105 |

* cited by examiner

*Primary Examiner* — Phong H Nguyen
(74) *Attorney, Agent, or Firm* — Dilworth & Barrese, LLP.; Michael J. Musella, Esq.

(57) ABSTRACT

An ultra-high pressure (UHP) cutting device for cutting an elongate body from outside the elongate body are disclosed herein. Embodiments of the UHP cutting device have a UHP tube with a top end and a bottom end opposite the top end, the UHP tube defining a lumen for receiving UHP fluid, a static mount for securing the cutting device to the elongate body, a rotatable mount rotatably connected to the static mount, a radially adjustable support member for adjusting a distance of the UHP tube to the elongate body, the radially adjustable support member being connected adjacent to the top end of the UHP tube and the rotatable mount, a drive in operational communication with the rotatable mount for rotating the rotatable mount during operation of the cutting device, and a cutter head in fluid communication with the UHP line. Related uses and methods are also disclosed herein.

20 Claims, 4 Drawing Sheets

ULTRA-HIGH PRESSURE CUTTING DEVICES, USES AND METHODS THEREOF

FIELD OF INVENTION

The present invention relates to ultra-high pressure cutting devices; more specifically, external ultra-high pressure cutting devices.

BACKGROUND OF THE INVENTION

The abandonment of non-producing or uneconomic oil or gas wells presents a number of safety and environment issues. Typically, in the abandonment process, all production and surface wellbore casings along with conductor barrels and cement liners have to be removed to a regulatory approved depth of, for example, two meters below the surface.

A previous method for such removal required a large scale excavation of soil from around the existing wellbore. In order to do this, line location companies needed to be brought in to determine locations of any existing oil, gas and/or utility lines. Proper safety practices typically require that a very large area be excavated to allow a welder and an assistant to descend into the area to the required depth to cut the existing steel casings and cement liners. This cutting of the casing is done using a cutting torch.

Typically, the casing is cut horizontally and then vertically to remove the outer layer. Any cement present then has to be removed using either a jackhammer or sledgehammer. This allows access to secondary steel casings that are cut using the cutting torch again.

Throughout this process, a source of ignition, the cutting torch, is being used in an area wherein there is a possibility for the presence of explosive or flammable gases or liquids. This type of work environment may be referred to as a hot work area. A significant safety threat is inherent for the personnel in a hot work area and is further exasperated through the used of a cutting torch or any other heat based cutting tool.

One previous attempt at overcoming this issue was to provide a different type of tool consisting of metal blades that would be lowered inside the casing and then rotated and expanded to cut through the casing. Such a tool is described in U.S. Pat. No. 5,685,078. Some problems associate with this tool and this method of cutting are that if there is movement of the casing while being cut, the tool becomes jammed inside the casing. In addition, being a metal-on-metal cut, there is still the possibility of sparking which can ignite any explosive or flammable gas or fluid and can also cause a heat build-up which may ignite any explosive or flammable gas or fluid in the hot work area. Further, the tool can only cut only layer at a time and has to be removed and set to a different cutting depth for each cut. Finally, this type of tool does not cut well or sometimes at all, though cement.

Another type of cutting device known in the art is a laser cutter. Laser cutting tools may be used to cut through casings but require proper ventilation to remove particulates, such as smoke, to work effectively. Such tools can be expensive and thus may also be cost prohibitive.

In some cases, a cutting device is inserted within the wellbore to cut the well casing from within. Such devices and methods are much less effective in cutting piles or wells that have been at least partially filled or blocked. For example, a well that is filled by cement during an abandonment procedure, or a cement pile for a wind turbine.

There is therefore a need to provide a cutting tool that overcomes one or more of the shortcomings of the current cutting tools or methods outlined above and/or observed in the field.

SUMMARY OF THE INVENTION

The present invention relates to ultra-high pressure (UHP) fluid cutting devices for cutting suitable bodies, such as pipes or piles. Such UHP fluid cutting devices are mounted on a terminal end of the body and are used to cut from outside of the body. The device rotates around a perimeter or circumference with an improved footprint and ease of use.

According to the present invention there is provided an ultra-high pressure (UHP) cutting device for cutting an elongate body from outside the elongate body, the UHP cutting device comprising a UHP connector for connection with a UHP line in communication with a fluid source, a UHP tube with a top end and a bottom end opposite the top end, the UHP tube defining a lumen for receiving UHP fluid, a static mount for securing the cutting device to the elongate body, a rotatable mount rotatably connected to the static mount, a radially adjustable support member for adjusting a distance of the UHP tube to the elongate body, the radially adjustable support member being connected adjacent to the top end of the UHP tube and the rotatable mount, a drive in operational communication with the rotatable mount for rotating the rotatable mount during operation of the cutting device, and a cutter head in fluid communication with the UHP line.

In some embodiments, the UHP cutting device further comprises a height adjustable support member at the top end of the UHP tube for adjusting a distance of the bottom end of the UHP tube to a top end of the elongate body. In further embodiments, the height adjustable support member comprises: a height adjustable bracket for receiving the UHP tube, and a height fastener for securing the UHP tube to the height adjustable support member.

In some embodiments, the cutter head comprises a UHP elbow for changing the direction of UHP fluid flow from a direction substantially parallel with the elongate body to a direction toward the outer surface of the elongate body, an abrasive feed port for connection with an abrasive feed line for receiving abrasive to be mixed with the UHP fluid, and a focus tube for directing the mixture of UHP fluid and abrasive out of the cutter head and toward the outer surface of the elongate body to be cut.

In some embodiments, the radially adjustable support member comprises a cross member connected to the UHP tube, a radially adjustable bracket for receiving the cross member, and a radius fastener for securing the cross member to the radially adjustable bracket. In further embodiments, the radially adjustable support member comprises a strut for supporting the radially adjustable bracket on the rotatable mount.

In further embodiments, the rotatable mount is rotatably connected to the static mount via a rotatable member. In yet further embodiments, the rotatable member is a bearing.

In some embodiments, the UHP connector comprises a UHP swivel attachment at the top end of the UHP tube connected to the UHP line, the UHP swivel attachment providing a sealed rotatable connection for the UHP line allowing the rotatable mount to rotate while the UHP line remains stationary, relative to the UHP tube.

In some embodiments, the UHP cutting device further comprises a manifold connecting the cutter head to the UHP tube.

In some embodiments, the elongated body is a well or pile. In some embodiments, the UHP line is stainless steel. In some embodiments, the drive is a hydraulic motor.

According to the present invention there is also provided an ultra-high pressure (UHP) cutting device for cutting an elongate body from outside the elongate body, the UHP cutting device comprising a UHP connector for connection with a UHP hose in communication with a fluid source, a UHP tube with a top end and a bottom end opposite the top end, the UHP tube defining a lumen for receiving a UHP line, a static mount for securing the cutting device to the elongate body, a rotatable mount rotatably connected to the static mount, a radially adjustable support member for adjusting a distance of the UHP tube to the elongate body, the radially adjustable support member being connected to the top end of the UHP tube and the rotatable mount, the radially adjustable support member comprising: a cross member connected to the UHP tube, a radially adjustable bracket for receiving the cross member, and a radius fastener for securing the cross member to the radially adjustable bracket, a height adjustable support member for adjusting a distance of the bottom end of the UHP tube to a top end of the elongate body, the height adjustable support member comprising: a height adjustable bracket for receiving the UHP tube, and a height fastener for securing the rotatable UHP tube to the height adjustable support member, a drive in operational communication with the rotatable mount for rotating the rotatable mount during operation of the cutting device, a UHP line passing through the UHP tube and connected at a top end to the UHP connector, and a cutter head in fluid communication with a bottom end of the UHP line.

In some embodiments, the rotatable mount is rotatably connected to the static mount via a rotatable member. In further embodiments, the rotatable member is a bearing.

In some embodiments, the UHP connector comprises a UHP swivel attachment at the top end of the UHP tube connected to the UHP hose and the UHP line, the UHP swivel attachment providing a sealed rotatable connection between the UHP hose and the UHP line allowing the rotatable mount to rotate while the UHP line remains stationary, relative to the UHP tube.

In some embodiments, the UHP cutting device further comprises a manifold connecting the cutter head to the UHP tube.

In some embodiments, the elongated body is a well or pile. In some embodiments, the UHP line is stainless steel. In some embodiments, the drive is a hydraulic motor.

According to the present invention there is also provided a use of an ultra-high pressure (UHP) cutting device for cutting an elongate body from outside the elongate body, the UHP cutting device comprising a UHP connector for connection with a UHP line in communication with a fluid source, a UHP tube with a top end and a bottom end opposite the top end, the UHP tube defining a lumen for receiving UHP fluid, a static mount for securing the cutting device to the elongate body, a rotatable mount rotatably connected to the static mount, a radially adjustable support member for adjusting a distance of the UHP tube to the elongate body, the radially adjustable support member being connected adjacent to the top end of the UHP tube and the rotatable mount, a drive in operational communication with the rotatable mount for rotating the rotatable mount during operation of the cutting device, and a cutter head in fluid communication with a bottom end of the UHP line.

In some embodiments, the UHP cutting device further comprises a height adjustable support member at the top end of the UHP tube for adjusting a distance of the bottom end of the UHP tube to a top end of the elongate body. In further embodiments, the height adjustable support member comprises a height adjustable bracket for receiving the UHP tube, and a height fastener for securing the UHP tube to the height adjustable support member.

In some embodiments, the cutter head comprises a UHP elbow for changing the direction of UHP fluid flow from a direction substantially parallel with the elongate body to a direction toward the outer surface of the elongate body, an abrasive feed port for connection with an abrasive feed line for receiving abrasive to be mixed with the UHP fluid, and a focus tube for directing the mixture of UHP fluid and abrasive out of the cutter head and toward the outer surface of the elongate body to be cut.

In some embodiments, the radially adjustable support member comprises a cross member connected to the UHP tube, a radially adjustable bracket for receiving the cross member, and a radius fastener for securing the cross member to the radially adjustable bracket. In further embodiments, the radially adjustable support member comprises a strut for supporting the radially adjustable bracket on the rotatable mount.

In further embodiments, the rotatable mount is rotatably connected to the static mount via a rotatable member. In yet further embodiments, the rotatable member is a bearing.

In some embodiments, the UHP connector comprises a UHP swivel attachment at the top end of the UHP tube connected to the UHP line, the UHP swivel attachment providing a sealed rotatable connection for the UHP line allowing the rotatable mount to rotate while the UHP line remains stationary, relative to the UHP tube.

In some embodiments, the UHP cutting device further comprises a manifold connecting the cutter head to the UHP tube.

In some embodiments, the elongated body is a well or pile. In some embodiments, the UHP line is stainless steel. In some embodiments, the drive is a hydraulic motor.

According to the present invention there is also provided a method of cutting an elongate body using a UHP cutting device, the method comprising attaching a static mount of the UHP cutting device to a top end of the elongate body, adjusting a radial distance of a UHP tube from the elongate body via a radially adjustable support member connected to the UHP tube and a rotatable mount, rotating the rotatable mount about a rotatable connection to the static mount, and cutting the elongate body via abrasive and UHP fluid emitted from a cutter head.

In some embodiments, the method further comprises adjusting the radial distance and cutting the elongate body occur simultaneously.

In some embodiments, the method further comprises adjusting a vertical distance from the cutter head to the top end of the elongate body via a height adjustable support member at a top end of the UHP tube. In further embodiments, adjusting the vertical distance and cutting the elongate body occur simultaneously.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

One or more illustrative embodiments have been described by way of example. Described herein are apparatuses, methods and uses relating to high-pressure cutting devices. It will be appreciated that embodiments and examples are provided for illustrative purposes intended for those skilled in the art, and are not meant to be limiting in any way. All references to embodiments, aspects, and the like is intended to be illustrative and non-limiting.

Figure 1:
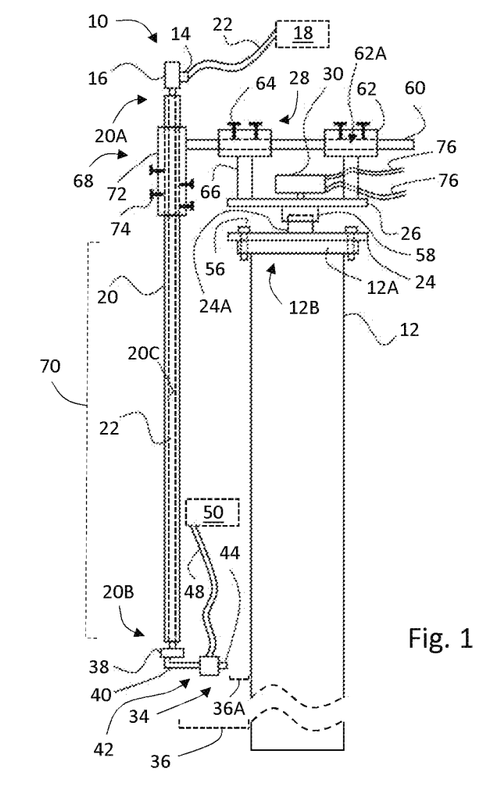
FIG. 1 is a side view of an embodiment of a UHP cutting device.
Figure 2:
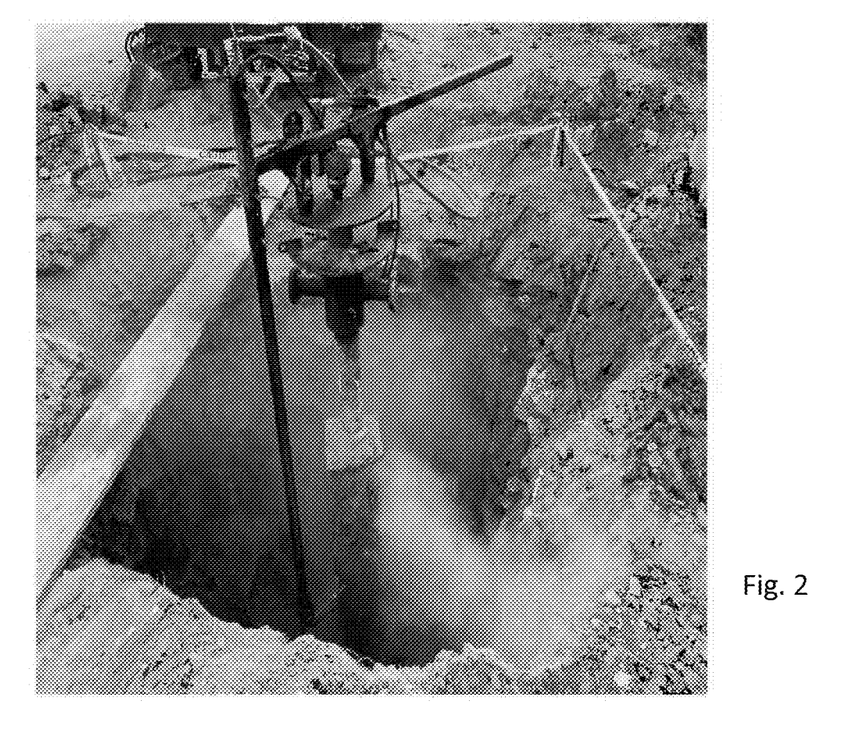
FIG. 2 is a perspective photographic view of an embodiment of a UHP cutting device.

Referring to FIG. 1, ultra-high pressure (UHP) cutting device 10 is shown mounted to elongate body 12. Such devices 10 may also be referred to as external UHP cutting devices. Elongate body 12 may be any suitable body to be cut, such as a cement pile, power pole, or well. Body 12 may be substantially upright (vertical), such as shown in FIG. 1, or substantially horizontal, such as a pipeline. Body 12 may have a suitable surface for attaching or mounting device 10, such as a flange 12A or pile cap. Body 12 may be substantially diagonal, such as in a slanted well.

Referring to FIG. 1, UHP cutting device 10 comprises a UHP connector 14 for connection with a UHP line 22. Line 22 is in communication with a fluid source 18, such as a high-pressure pump, for delivering fluid, such as water, to device 10. Generally, the UHP line is connected after attachment of the cutting device 10 to body 12, however, connection may be done prior to attachment. Connecting UHP connector 14 to top end 22A may reduce tangling of the UHP line and ease of rotation of the cutting device 10 during operation. UHP line 22 may be made from a suitable material, such as stainless steel.

UHP connector 14 may comprise a UHP swivel attachment 16 at the top end 20A of UHP tube 20. Swivel attachment 16 may be connected to the UHP line 22. UHP swivel attachment 16 may be used to provide a sealed rotatable connection for UHP line 22, thus allowing rotatable mount 26 to rotate while UHP line 22 remains substantially stationary or non-rotational relative to UHP tube 20. A collar (not shown) may be used to fluidly connect the swivel attachment 16 with the UHP tube 20. It will be appreciated that all connections along the UHP fluid path from the pump 18 to the cutter head 34 must be sufficiently robust to withstand ultra-high pressures without leaking or breaking during use.

Although the embodiments shown in the Figures depict the UHP line 22 and abrasive/sand line 48 as being external to the device 10, a person of skill in the art will understand that at least parts of lines 22 and 48 may be housed within device 10. For example, abrasive line 48 may be located at the top end 20A in proximity to the UHP line 22. In such embodiments, mixing may occur within or prior to entering UHP tube 20.

Figure 3:
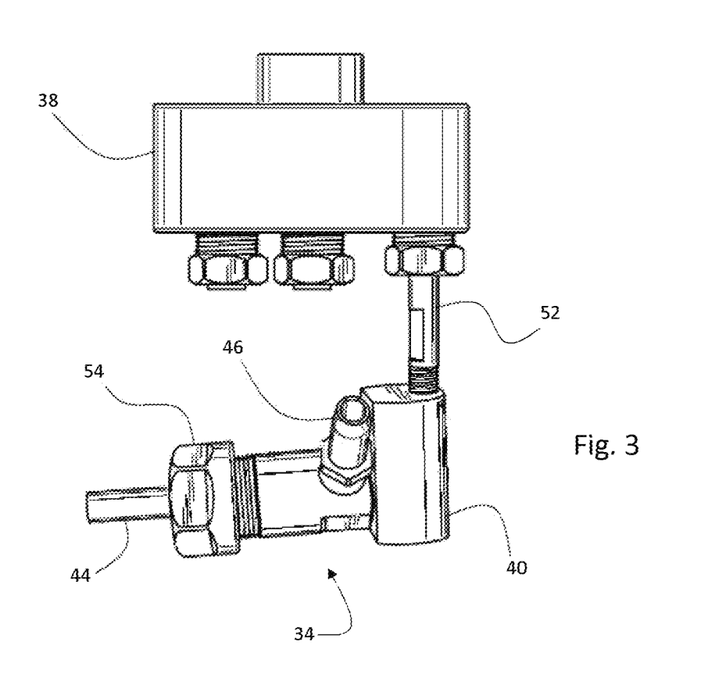
FIG. 3 is a side view of an embodiment of a cutter head of the UHP cutting device of FIG. 1.

Referring to FIGS. 1 and 3, UHP cutting device 10 comprises a UHP tube 20 with a top end 20A and an opposed bottom end 20B. UHP tube 20 defines a lumen 20C that extends along a length of the tube 20. In some cases, lumen 20C receives UHP line 22, while in other cases, the lumen 20C is a passage for UHP fluid to travel from UHP line 22 to cutter head 34. UHP tube 20 may extend to the bottom of cutting device 10 and allow for fluid communication of the fluid with a suitable UHP manifold of cutter head 34, such as manifold 38. In one or more embodiments, UHP line 22 is received within lumen 20C and extends from top end 20A to bottom end 20B. In such embodiments, UHP line 22 may be continuous from pump to cutter head. UHP line 22 may be segmented, with each segment connected via high pressure fittings. UHP line 22 may be made of a suitable material, such as rubber, steel braiding or a combination thereof.

Referring to FIG. 1, UHP cutting device comprises cutter head 34 in fluid communication with the UHP line 32 and/or UHP tube 20. Cutter head 34 may be a suitable cutter head known in the art, for example those described in U.S. Pat. No. 8,820,396, herein incorporated by reference in its entirety. Cutter head 34 may comprise a manifold 38 that directs the UHP fluid through a UHP elbow 40, generally 90 degrees, with an orifice assembly 42. The orifice assembly 42 may reduce the fluid flow rate and increase the pressure of the fluid as it travels to the cutter head 34 and directed out of the focus tube 44. The cutter head 34 may include an abrasive feed port 46 to which an abrasive feed line 48 is attached for supplying abrasive to the cutter head from an external abrasive source 50 for combining with the fluid for eventual direction out through the focus tube 44. During normal operation, the abrasive that is fed to the cutter head 34 through the abrasive feed port 46 may be drawn though the abrasive feed line 48 by suction, or a reduction in pressure, created by the high pressure fluid, such as water, passing over the abrasive feed port 46 in the cutter head 34.

Figure 4:
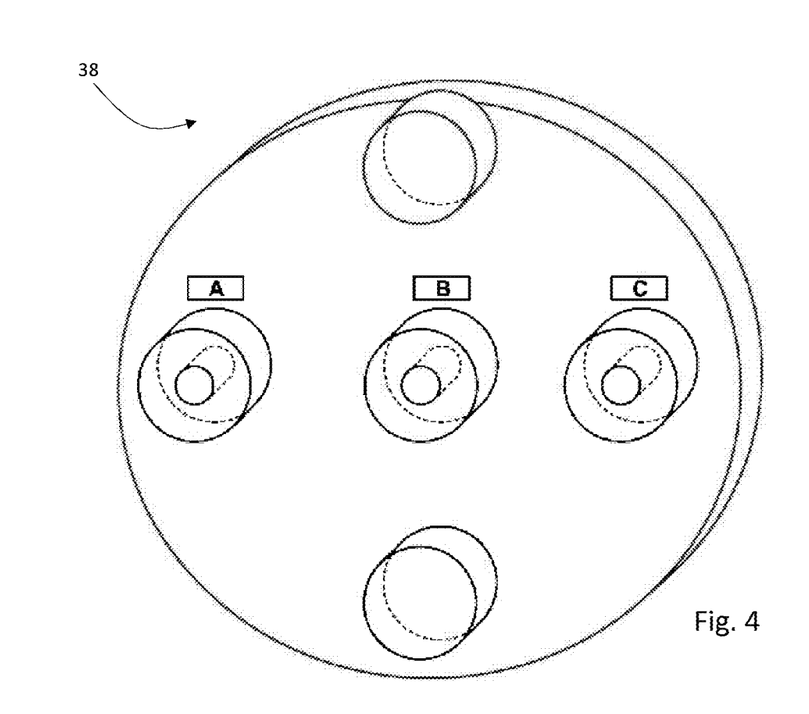
FIG. 4 is a perspective view of an embodiment of a manifold of the cutter head of FIG. 3.

Referring to FIGS. 3 and 4, UHP manifold 38 may contain a number of apertures suitable for fluid transmission from the UHP tube 20 to the cutter head 34. The positioning of each aperture may allow for various offset changes in the cutter head 34 and by extension the focus tube 44 by directing the flow of the UHP fluid through a particular aperture. In addition, the diameter of any of the apertures in the manifold 38 may be different than the inside diameter of the UHP tube 20 thereby effecting the fluid pressure in the cutter head 34. The cutter head 34 may be connected directly or indirectly to any of the apertures in the UHP manifold 38 to allow for a suitable distance between the focus tube 44 and the outer surface of elongate body 12. One example of a UHP manifold 38 is shown in FIG. 4 which contains apertures A, B and C. On the UHP manifold 38, aperture A is the farthest aperture from the center of the UHP manifold 38, aperture B is the center aperture and aperture C is closer to B then A to allow for a variety of potential setups and distances. Optionally, an extension head in communication with any of the apertures on one end and the cutter head 34 may be used to reposition the cutter 34 at a desired position a suitable distance from the inner surface of the wellbore.

A tube nipple with gland nut 52 may be used to attach the UHP elbow 40 to the UHP manifold 38. A collet and nut 54 may be used to retain the focus tube 44 inside the cutter head 34. One embodiment of a cutter head 34 with a focus tube 44, abrasive feed port 46, tube nipple with gland nut 52, UHP elbow 40, collet and nut 54 and UHP manifold 38 is shown in detail in FIG. 3.

Although cutter head 34 and UHP elbow 40 are shown as being approximately 90°, a person of skill in the art would understand that other angles could be used without departing from the invention. In some cases, cutter head 34 is angled substantially towards a central axis of body 12 during rotation and cutting operations. A person of skill in the art will understand that cutter head 34 may be aimed away from a central axis of body 12. For example, cutter head 34 may be angled substantially toward or away from a direction of rotation.

Referring to FIG. 1, UHP cutting device 10 comprises static mount 24 for securing device 10 to the elongate body 12. Static mount may be mounted to a terminal end of elongate body 12 via suitable fasteners 56, such as bolts and nuts. Other fasteners known in the art may be used, such as tack welding. Static mount 24 may be used as a base or anchor to secure device 10 to a suitable part of body 12, such as a flange 12A or pile cap. Static mount 24 may have a suitable structure, such as a post 24A, for spacing rotatable mount 26 from body 12 and static mount 24. Post 24A may mount rotatable member 58.

Referring to FIG. 1, UHP cutting device 10 comprises rotatable mount 26 rotatably connected to the static mount 24. The rotatable mount may be configured to rotate relative to the static mount 24 and/or elongate body 12. The rotatable mount 26 may be rotatably connected to the static mount 24 via a rotatable member 58, such as a bearing. A person of skill in the art would understand that a suitable bearing or other rotatable connection would be at least water resistant and sand resistant.

Referring to FIG. 1, UHP cutting device 10 comprises radially adjustable support member 28 for adjusting a distance 36 of the UHP tube 20 to the elongate body 12. The radially adjustable support member 28 is connected adjacent to the top end 20A of the UHP tube 20. Radially adjustable support member 28 may be used to adjust a position of cutter head 34 in a relatively horizontal plane.

Radially adjustable support member 28 may be connected to UHP tube 20 via a cross member 60. Cross member 60 may extend at least partially across rotatable mount 26. Cross member 60 may be received in one or more radially adjustable brackets 62. Brackets 62 may define an inner channel 62A shaped to receive cross member 60. Brackets 62 may comprise one or more fasteners 64 for securing cross member 60 to radially adjustable support member 28. Fasteners 64 may be any suitable fastener known in the art, such as set screws or bolts. Radially adjustable support member 28 may comprise a structural member 66, such as a strut, that connects and supports member 28 to rotatable mount 26. In embodiments without one or more structural member 66, the radially adjustable support member 28 may be mounted directly to rotatable mount 26.

Although embodiments of radially adjustable support member 28 are shown in FIGS. 1 and 3 with a cross member 60 received in one or more brackets 62, a person of skill in the art will appreciate that other radially adjustable support members would also work. For example, one or more gears may be used to move cross member 62 in a substantially horizontal position. The adjustment of distance 36 may be done manually, such as by a user, or automatically, for example by a motor coupled to a controller. The radially adjustable member may have one or more additional reinforcements, such as additional structural members 66 or more robust brackets 62 and fasteners 64 to support/accommodate longer and/or heavier cross members 28.

In some cases, distance 36 is about 0.1-5 feet or any value therebetween (optionally rounded to the nearest 0.1), or any subrange spanning between any two of these values, such as about 1-15 feet. In another embodiment, distance 36 is between about 0.25 to about 19 inches. For example, distance 36 is about 0.1, 0.11, 0.12, 0.13, 0.14, 0.15, 0.16, 0.17, 0.18, 0.19, 0.2, 0.21, 0.22, 0.23, 0.24, 0.25, 0.3, 0.35, 0.4, 0.45, 0.5, 0.55, 0.6, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2, 2.05, 2.1, 2.15, 2.2, 2.25, 2.3, 2.35, 2.4, 2.45, 2.5, 2.55, 2.6, 2.65, 2.7, 2.75, 2.8, 2.85, 2.9, 2.95, 3, 3.05, 3.1, 3.15, 3.2, 3.25, 3.3, 3.35, 3.4, 3.45, 3.5, 3.55, 3.6, 3.65, 3.7, 3.75, 3.8, 3.85, 3.9, 3.95, 4, 4.1, 4.2, 4.3, 4.4, 4.5, 4.6, 4.7, 4.8, 4.9, or 5 feet.

Cutting tip 44 may be a suitable distance 66A from elongate body 12 in use. For example, the cutting tip 44 may be about 0.01-3 inches from the elongate body.

Referring to FIG. 1, device 10 may comprise a height adjustable support member 68 connected to UHP tube 20 for adjusting a distance 70 of the bottom end of the UHP tube 20B to a top end 12B of elongate body 12. Height adjustable support member 68 may be used to adjust a vertical position of cutter head 34 along elongate body 12. Height adjustable support member 68 may comprise a height adjustable bracket 72 for receiving UHP tube 20. The height adjustable bracket 72 may be shaped to receive UHP tube 20 and may comprise one or more fasteners 74 for securing the tube 20 to the bracket 72. Height adjustable support member 68 may comprise two or more brackets 72 disposed along a length of tube 20 (not shown). The height adjustable member 68 may have one or more additional reinforcements, such as additional structural members or more robust brackets 72 and fasteners 74 to support/accommodate a longer and/or heavier UHP tube 20.

Although embodiments of height adjustable support member 68 are shown in FIGS. 1 and 3 with a tube 20 received in bracket 72, a person of skill in the art will appreciate that other height adjustable support members would also work. For example, one or more gears may be used to move tube 20 in a substantially vertical position. The adjustment of distance 70 may be done manually, such as by a user, or automatically, for example by a motor coupled to a controller.

In some cases, distance 70 is about 0.5-50 feet or any value therebetween (optionally rounded to the nearest 0.1), or any subrange spanning between any two of these values, such as 1-15 feet. For example, distance 70 is about 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, or 50 feet. In some embodiments, the distance 70 is about 0.5-20 feet.

Referring to FIG. 1, UHP cutting device 10 comprises drive 30 in operational communication with the rotatable mount 26 for rotating the rotatable mount 26 during operation of device 10. Drive 30 is used to rotate the UHP tube 20 and thereby rotate the cutter head 34 and the focus tube 44 to rotate the direction of the fluid/abrasive around the outer circumference and cut elongate body 12. As will be appreciated, the rotating means may be external to the cutting device 10. For example, the drive 30 may rotate a shaft that is coupled to rotatable mount 26. Drive 30 may be any suitable motor that produces enough power to rotate the rotatable mount 26 and UHP tube 20 around elongate body 12. For example, the drive may be a hydraulic motor with hydraulic lines 76. In some embodiments, drive 30 is an electric motor. A gear reduction unit (not pictured) may be coupled to drive 30. The gear reduction unit may include gearing to reduce the rate of rotation of the UHP tube 20. It will be appreciated that any suitable drive/motor 30 and gear reduction unit may be used to provide for rotation of the UHP tube 20 at a rate suitable to cut the liner and casing of body 12 at the desired fluid pressure.

In some embodiments, the UHP tube 20 and/or cutter head 42 comprises a guide (not pictured) for supporting UHP tube 20 at bottom end 20B. The guide may have a mobile element, such as one or more wheels, that allow the guide to move or ride along the exterior surface of elongate body 12 as the UHP tube 20 rotates around the elongate body 12. The guide may be mounted to UHP tube and provide flexible support across distance 36 between the UHP tube 20 and elongate body 12. In some embodiments, the guide is a spring-loaded circular guide at or near bottom end 20B of UHP tube 20. Such guides may be used with device 10 when in a substantially vertical configuration (as shown in FIG. 1) or a substantially horizontal configuration, such as when used to cut a pipeline. The guide may be spring loaded to provide lateral movement of the guide relative to UHP tube 20.

Methods of cutting elongate body 12 using the UHP cutting device 10 as outlined above will involve first attaching static mount 24 of the UHP cutting device 10 to top end 12B, such as at or near flange 12A. UHP cutting device may be secured to an external support during installation or operation, such as a crane. In such embodiments, the device may be lowered onto top end 12B via the crane and then static mount 24 is attached via fasteners 56. The device 10 may then be uncoupled from the crane.

Radial distance 36 of a UHP tube from the elongate body is then adjusted via radially adjustable support member 28 to position the cutter head 34 adjacent to an area of body 12 to be cut. The rotatable mount 26 is then rotated about the rotatable connection to static mount 24, thus rotating UHP tube and cutter head 34 around an outer circumference or perimeter of body 12. The elongate body 12 is then cut by supplying abrasive and UHP fluid to cutter head 34 via UHP line 22 and UHP tube 20. Rotation and cutting operations will occur simultaneously for at least part of the rotation step.

In some cases, ground or earth surrounding the body 12 will be removed prior to attachment/installation of the device 10. Earth removal may occur via methods known in the art, such as hydrovac, excavator, shovels, airvacs or others. Removal of the ground or earth may be removed during operation of the device 10. As will be appreciated by a person of skill in the art, device 10 has a relatively small footprint and thus, less excavation may be needed prior to installation and operation of the device 10.

One or more of the radial distance 36 and vertical distance 70 may be adjusted prior, during or after cutting elongate body 12. In some cases, the distance 36 may be adjusted simultaneously with cutting operation to compensate for irregular contours, such as bumps or raised spots, on elongate bodies 12 or to compensate for bodies 12 with irregular shapes, such as ovular.

All citations are hereby incorporated by reference. In the event of conflicting information with statements between any reference to or incorporated herein, and the present disclosure, the present disclosure will act as the guiding authority.

The present invention has been described with regard to one or more embodiments. However, it will be apparent to persons skilled in the art that a number of variations and modifications can be made without departing from the scope of the invention as defined in the claims.

What is claimed is:

1. An ultra-high pressure (UHP) cutting device for cutting an elongate body from outside the elongate body, the UHP cutting device comprising:
   a UHP connector for connection with a UHP line in communication with a fluid source;
   a UHP tube with a top end and a bottom end opposite the top end, the UHP tube defining a lumen for receiving UHP fluid;
   a static mount for securing the cutting device to the elongate body;
   a rotatable mount rotatably connected to the static mount;
   a radially adjustable support member for adjusting a distance of the UHP tube to the elongate body, the radially adjustable support member being connected adjacent to the top end of the UHP tube and the rotatable mount;
   a drive in operational communication with the rotatable mount for rotating the rotatable mount during operation of the cutting device; and
   a cutter head in fluid communication with the UHP line.

2. The UHP cutting device of claim 1, further comprising a height adjustable support member at the top end of the UHP tube for adjusting a distance of the bottom end of the UHP tube to a top end of the elongate body.

3. The UHP cutting device of claim 2, wherein the height adjustable support member comprises:
   a height adjustable bracket for receiving the UHP tube; and
   a height fastener for securing the UHP tube to the height adjustable support member.

4. The UHP cutting device of claim 1, wherein the radially adjustable support member comprises:
   a cross member connected to the UHP tube;
   a radially adjustable bracket for receiving the cross member; and
   a radius fastener for securing the cross member to the radially adjustable bracket.

5. The UHP cutting device of claim 1, wherein the rotatable mount is rotatably connected to the static mount via a rotatable member.

6. The UHP cutting device of claim 5, wherein the rotatable member is a bearing.

7. The UHP cutting device of claim 1, wherein the UHP connector comprises a UHP swivel attachment at the top end of the UHP tube connected to the UHP line, the UHP swivel attachment providing a sealed rotatable connection for the UHP line allowing the rotatable mount to rotate while the UHP line remains stationary, relative to the UHP tube.

8. The UHP cutting device of claim 1, further comprising a manifold connecting the cutter head to the UHP tube.

9. The UHP cutting device of claim 1, wherein the elongated body is a well or pile.

10. The UHP cutting device of claim 1, wherein the UHP line is stainless steel.

11. The UHP cutting device of claim 1, wherein the drive is a hydraulic motor.

12. An ultra-high pressure (UHP) cutting device for cutting an elongate body from outside the elongate body, the UHP cutting device comprising:
    a UHP connector for connection with a UHP hose in communication with a fluid source;
    a UHP tube with a top end and a bottom end opposite the top end, the UHP tube defining a lumen for receiving a UHP line;
    a static mount for securing the cutting device to the elongate body;

a rotatable mount rotatably connected to the static mount;
a radially adjustable support member for adjusting a distance of the UHP tube to the elongate body, the radially adjustable support member being connected to the top end of the UHP tube and the rotatable mount, the radially adjustable support member comprising:
a cross member connected to the UHP tube;
a radially adjustable bracket for receiving the cross member; and
a radius fastener for securing the cross member to the radially adjustable bracket;
a height adjustable support member for adjusting a distance of the bottom end of the UHP tube to a top end of the elongate body, the height adjustable support member comprising:
a height adjustable bracket for receiving the UHP tube; and
a height fastener for securing the rotatable UHP tube to the height adjustable support member;
a drive in operational communication with the rotatable mount for rotating the rotatable mount during operation of the cutting device;
a UHP line passing through the UHP tube and connected at a top end to the UHP connector; and
a cutter head in fluid communication with a bottom end of the UHP line.

13. The UHP cutting device of claim 12, wherein the rotatable mount is rotatably connected to the static mount via a rotatable member.

14. The UHP cutting device of claim 13, wherein the rotatable member is a bearing.

15. The UHP cutting device of claim 13, wherein the UHP connector comprises a UHP swivel attachment at the top end of the UHP tube connected to the UHP hose and the UHP line, the UHP swivel attachment providing a sealed rotatable connection between the UHP hose and the UHP line allowing the rotatable mount to rotate while the UHP line remains stationary, relative to the UHP tube.

16. The UHP cutting device of claim 1, further comprising a manifold connecting the cutter head to the UHP tube.

17. The UHP cutting device of claim 1, wherein the elongated body is a well or pile.

18. The UHP cutting device of claim 1, wherein the UHP line is stainless steel.

19. The UHP cutting device of claim 1, wherein the drive is a hydraulic motor.

20. A method of cutting an elongate body using Use of an ultra-high pressure (UHP) cutting device comprising:
a UHP connector for connection with a UHP line in communication with a fluid source;
a UHP tube with a top end and a bottom end opposite the top end, the UHP tube defining a lumen for receiving UHP fluid;
a static mount for securing the cutting device to the elongate body;
a rotatable mount rotatably connected to the static mount;
a radially adjustable support member for adjusting a distance of the UHP tube to the elongate body, the radially adjustable support member being connected adjacent to the top end of the UHP tube and the rotatable mount;
a drive in operational communication with the rotatable mount for rotating the rotatable mount during operation of the cutting device; and
a cutter head in fluid communication with a bottom end of the UHP line,
the method comprising the steps of:
attaching a static mount of the UHP cutting device to a top end of the elongate body;
adjusting a radial distance of a UHP tube from the elongate body via a radially adjustable support member connected to the UHP tube and a rotatable mount;
rotating the rotatable mount about a rotatable connection to the static mount; and
cutting the elongate body via abrasive and UHP fluid emitted from a cutter head.

* * * * *